Figure 1:
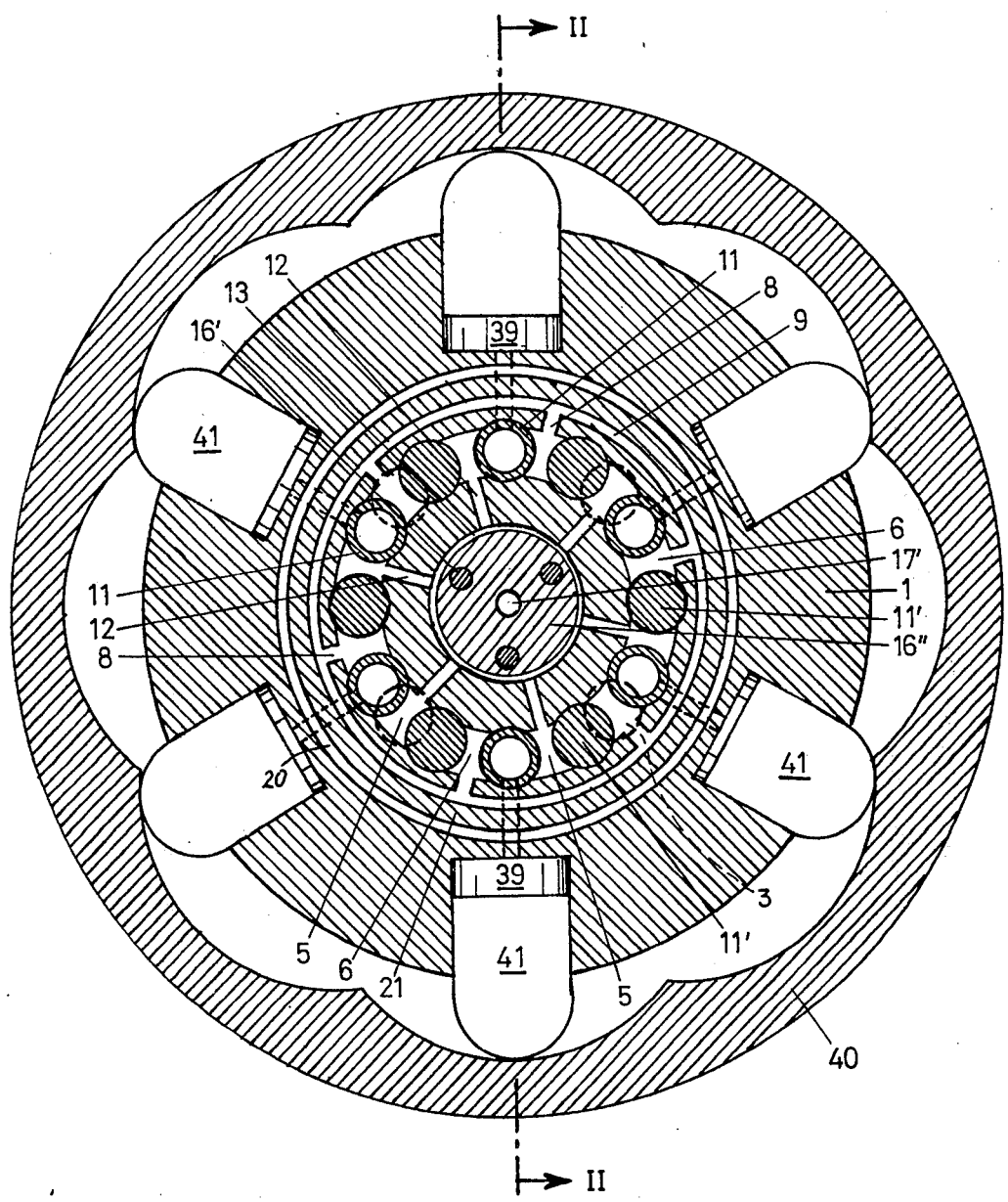

United States Patent [19]

Cyphelly

[11] 4,070,950
[45] Jan. 31, 1978

[54] HYDRAULIC APPARATUS INCLUDING ROTARY VALVE

[76] Inventor: Ivan Jaroslav Cyphelly, Forchstrasse 968, Hinteregg, Switzerland, 8128

[21] Appl. No.: 630,347

[22] Filed: Nov. 10, 1975

[30] Foreign Application Priority Data

Dec. 12, 1974 Switzerland .................. 16557/74

[51] Int. Cl.$^2$ .................. F01B 3/10; F16K 11/06
[52] U.S. Cl. .................. 91/487; 137/625.46
[58] Field of Search .................. 137/625.46; 91/180, 91/487, 491–498

[56] References Cited

U.S. PATENT DOCUMENTS

| | | | |
|---|---|---|---|
| 3,046,950 | 7/1962 | Smith | 91/491 |
| 3,136,263 | 6/1964 | Timms | 91/472 |
| 3,696,710 | 10/1972 | Ortelli | 91/487 |
| 3,768,516 | 10/1973 | Cyphelly | 137/625.46 |
| 3,796,136 | 3/1974 | Ogonl | 91/491 |

FOREIGN PATENT DOCUMENTS

| | | | |
|---|---|---|---|
| 1,816,662 | 7/1970 | Germany | 91/492 |
| 211,326 | 2/1924 | United Kingdom | 91/503 |

Primary Examiner—William L. Freeh
Attorney, Agent, or Firm—Hans Berman

[57] ABSTRACT

A rotary valve coupled to a radial cylinder motor sequentially provides pressure fluid to the cylinders of the motor and drains the cylinders through discharge openings in the valve casing. The rotary distributor of the valve and the valve casing have each two radial face portions directed in opposite axial directions and defining two throttling gaps connected by a chamber in the casing and respectively communicating with intake and return openings in the casing so that a pressure intermediate the intake and return pressures of a fluid prevails in the chamber and axially biases the distributor outward of the chamber while the substantially full hydraulic fluid pressure biases the distributor inward of the chamber. Recesses in the distributor alternatively connect discharge openings with the intake opening and the return opening of the valve casing. The distributor floats axially in the valve casing under the opposed biasing pressures.

5 Claims, 2 Drawing Figures

HYDRAULIC APPARATUS INCLUDING ROTARY VALVE

This invention relates to hydraulic apparatus, and more particularly to a rotary control valve and to its application in hydraulic apparatus.

In my earlier U.S. Pat. No. 3,768,516, I disclosed a rotary valve whose distributor is mounted in a casing for angular movement, recesses in the casing and distributor being aligned in certain angular positions of the distributor for controlling fluid flow through the valve between an intake opening and a discharge opening. The distributor is axially floated in the casing by the operating pressure of the controlled fluid acting on a radially extending front face of the distributor while a rear face of the distributor is under the reduced pressure of the fluid in a chamber communicating with the intake opening through a throttling gap between the distributor and casing and vented through a manually adjustable valve. Any impurities accumulating in the throttling gap and unduly increasing the operating force necessary for turning the distributor can be flushed from the gap by opening the manually adjustable valve.

It has now been found that the manually adjustable flushing valve is not required in a rotary control valve of the type described if the force available for turning the distributor is greater than would be necessary in the event of partial clogging of the throttling gap by accumulated contaminants, and that such clogging can be avoided by a constant flow of fluid through the gap and the chamber if the distributor is turned frequently or continuously relative to the casing.

Because the flushing valve of my earlier invention contributes significantly to the cost of the control valve, elimination of the flushing valve reduces the cost of the control valve. Further reductions in the cost of building a rotary control valve provided with an axially floating distributor are important objects of this invention which, in one of its aspects, resides in the rotary valve.

A casing of the valve has a body portion formed with intake, discharge, and return openings. A distributor is secured to the body portion for angular movement about an axis and for limited axial movement and has radially extending front and rear faces. An operating device may move the distributor about the axis. The body portion and the front face of the distributor are formed with respective recesses alignable for connecting the intake and discharge openings in a predetermined angular distributor portion for fluid flow between the intake and discharge openings in a first path through the valve casing.

A cover which spacedly envelops the distributor in sealing engagement with the body portion and the rear face of the distributor bound a chamber. A face of the body portion and the front face of the distributor axially define a first throttling gap connecting the intake opening to the chamber, and a second throttling gap connecting the chamber to the return opening is axially defined between a face of the cover and a rear face portion of the distributor so that the intake and return openings, the throttling gaps, and the chamber define a second path of fluid flow through the valve casing whose effective flow section is smaller than the effective flow section of the afore-mentioned first path.

Figure 2:
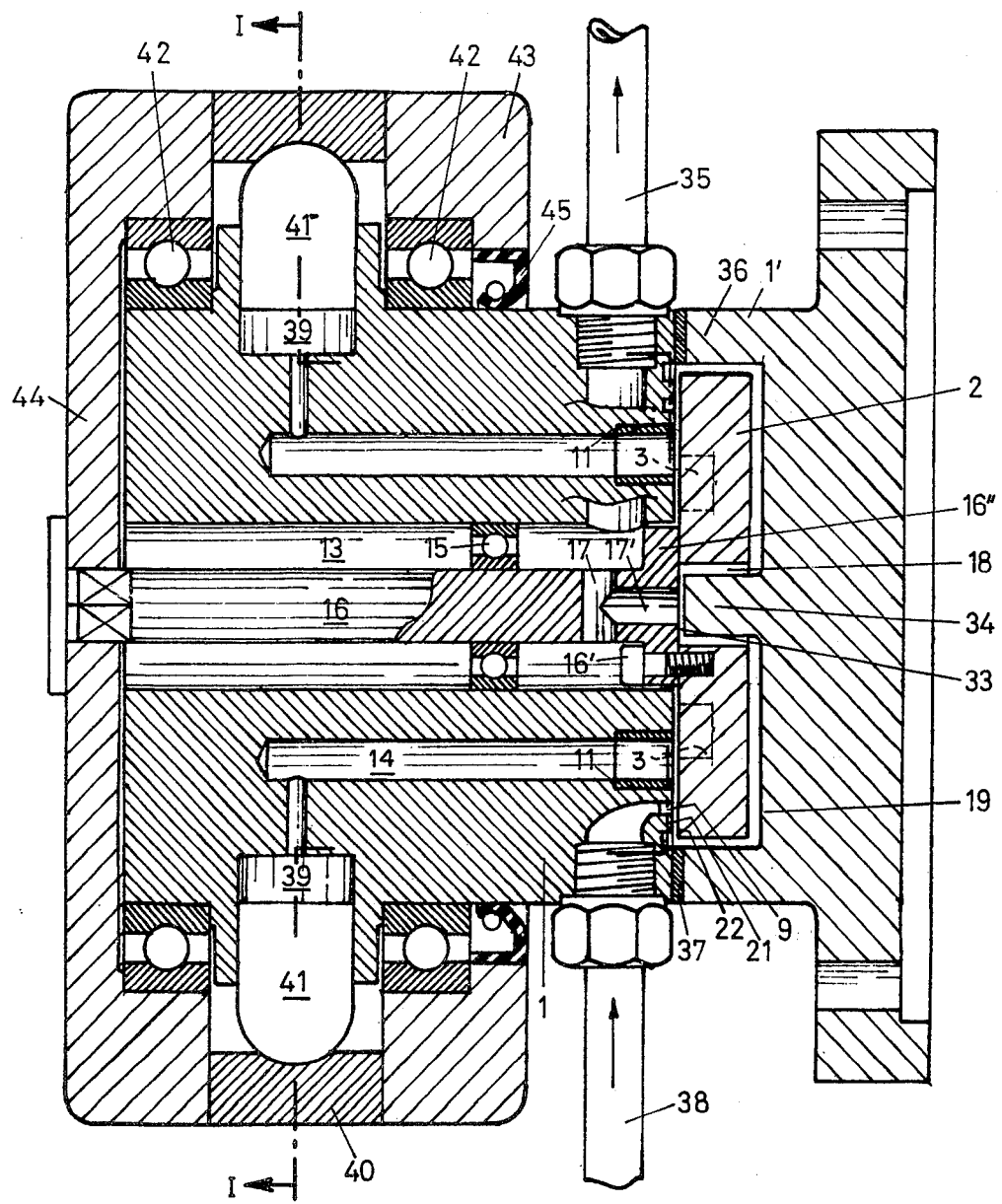

Other features, additional objects, and many of the attendant advantages of this invention will readily be appreciated as the same becomes better understood by reference to the following description of a preferred embodiment when considered in connection with the appended drawing in which:

FIG. 1 shows hydraulic apparatus of the invention is section on the line I — I in FIG. 2; and FIG. 2 illustrates the apparatus in section on the line II — II in FIG. 1.

Referring now to the drawing in detail, there are shown a radial cylinder motor and a rotary valve of the invention which controls liquid flow to the several cylinders of the motor and is itself operated by the motor. As is best seen in FIG. 2, the valve casing has a body portion 1 which simultaneously constitutes the stationary part of the motor and a cover portion 1' fixedly fastened to the body portion 1 in a conventional manner, not shown. An integral flange on the cover portion permits the illustrated apparatus to be mounted on a support.

The two casing portions have respective planar, parallel, circular sealing faces arranged opposite each other at a small distance defined by a flat, annular shim 37. A wide annular groove 19 in the sealing face of the cover portion 1' extends radially inward from the rim part 36 of the cover portion to a central pin 34 which is an integral part of the cover portion 1'.

The sealing face of the body portion 1 is formed with three, coaxial, circular grooves and a central bore 13, best seen in FIG. 1. The innermost or first groove is divided into alternating circumferential sections 5, 6 by six nipples 11 having orifices in the plane of the sealing face and six plugs 11'. The plugs and nipples alternate circumferentially and are equiangularly distributed about the bore 13 which permanently communicates with the six sections 5 through radial grooves 12 in the sealing face. The six sections 6 permanently communicate with the second groove 9 through radial grooves 8. The second groove 9 is separated from the third or outermost groove 20 by a circular land 21 of the sealing surface.

As is seen in FIG. 2, the movable valve elements include a flat annular disc 2 which is a portion of a distributor assembly and is received in the groove 19 of the cover portion 1' with ample clearance. The pin 34 is loosely received in the central bore 18 of the disc 2. The disc has a planar, annular front face opposite the sealing face of the body portion 1 and formed with equiangularly distributed cylindrical recesses 3 radially aligned with the innermost groove in the sealing face of the body portion 1. Two recesses are seen in FIG. 2. Four additional recesses 3 are indicated in phantom view in FIG. 1 and are dimensioned to connect two nipples 11 with respective groove portions 5, and two other nipples with groove sections 6 in the angular position of the disc 2 seen in the drawing. The two recesses 3 illustrated in FIG. 2 separate the aligned nipples 11 from adjacent groove portions 5, 6, as is evident from FIG. 1.

Further in FIG. 2, there is seen a shaft 16 of the distributor assembly coaxially mounted in the bore 13 of the body portion 1 by means of a ball bearing 15 which permits limited axial movement of the shaft. Screws 16' fasten an integral flange 16" at one axial end of the shaft 16 to the disc 2. The radial end face of the flange 16" is planar and covers the central bore 18 of the disc 2 so that the face portion of the flange 16" exposed in the bore 18 is at least approximately coplanar with the radial front face of the disc 2 and constitutes a portion of the rear face of the distributor.

A pressure line 38 connects a non-illustrated positive displacement pump to an intake opening of the body portion and to the second groove 9 in the sealing face of the body portion 1 for distribution of fluid by the disc 2 as will presently be described. A narrow gap 22 between the land 21 and the annular face of the disc 2 reduces the pressure in pumped hydraulic fluid flowing from the groove 9 into the groove 20 and thence into the groove 19 into a chamber behind the disc 2.

A return line 35 communicates through an opening in the body portion 1 with the central bore 13 of the body portion 1 and leads to the sump of the pressure pump which is open to the atmosphere in a conventional manner, not shown. An axial bore 17' in the shaft 16 communicates with the bore 13 of the body portion 1 through radial bores 17 and has an orifice in the radial end face of the flange 16" opposite the pin 34, the end face and the pin axially defining a narrow throttling gap 33 which connects the groove 19 with the open sump, not shown, through the bores 17', 17, 13. During operation of the apparatus, a trickle of hydraulic fluid thus moves continuously from the pressure line 38 through the groove 19 to the return line 35. Approximately full pump pressure in the groove 9 and the communicating groove sections 6 tends to shift the disc 2 axially toward the cover portion 1' and is opposed by the intermediate fluid pressure acting in the groove 19 on the larger rear face of the disc 2. When the disc 2 moves toward the cover portion 1', the gap 22 is widened and the gap 33 is narrowed, and vice versa.

Axial discharge bores 14 in the body portion 1 connect the six nipples 11 to respective cylinder spaces 39 which are open in a radially outward direction and equiangularly distributed about the shaft 16. A plunger 41 is sealingly received in each space 39 and driven outward of the space by fluid pressure when the associated nipple 11 is connected with a groove section 6 by a recess 3.

The rounded outer end of each plunger 41 travels along a cam ring 40 having eight lobes evident from FIG. 1. The cam ring is mounted between a bearing ring 43 and a cap 44 supported on the body portion 1 by ball bearings 42 coaxial with the shaft 16. The cap 44 axially closes the bore 13 and is provided with a bore of square cross section in which the end of the shaft 16 remote from the flange 16" is conformingly secured against rotation, but capable of some axial movement so that the distributor assembly 2, 16 turns jointly with the rings 40, 43 and the cap 44 which provide a cylindrical pulley face for a drive belt, not shown. The cam ring 40 is turned by the plungers 41 under fluid pressure, and moves the plungers radially inward when their spaces 39 are drained to the return line through the groove sections 5.

Leakage of fluid from the hydraulic apparatus is prevented by a flexible sealing ring 45 interposed between the bearing ring 43 and the body portion 1.

The sealing faces of the two casing portions 1, 1' are ground and lapped so that the shim 37, which serves as a spacer between the casing portions, defines the combined width of the throttling gaps 22, 33, and may be chosen to suit specific operating conditions. Additional control of the throttling gaps is possible by interposing a shim between the flange 16" and the disc 2.

Under constant operating conditions, the distributor is held in a constant axial position by the fluid pressures acting on its front and rear faces. A thin, but adequate film of lubricating fluid is maintained over all faces of the movable valve elements during rotation of the disc 2. Only a small amount of fluid flows in the secondary, narrow path through the throttling gaps 22, 33, but the constant fluid flow sweeps any solid contaminants from the gaps while the radial planar faces axially bonding the gaps are turned by the hydraulic motor relative to each other with a force capable of overcoming any resistance offered by contaminants.

The flow of fluid from the pressure line 38 to the individual cylinder spaces 39 and thence to the return line 35 is controlled by the recesses 3 in the distributor disc 2 which rotates jointly with the shaft 16 and the cam 40. The pressure line 38 communicates at all times with the circular groove 9, the six radial grooves 8, and the six circumferential sections 6. In the position of the disc 2 illustrated in FIG. 1, the two plungers 41 in the 4 o'clock and 10 o'clock positions are pushed radially outward by pressure fluid admitted to the associated nipples 11 through two recesses 3 which each simultaneously overlap a nipple 11 and a section 6. The outward pressure of these two plungers 41 causes the cam 40 to rotate counterclockwise, as viewed in FIG. 1.

The return line 35 communicates permanently with the bore 13, the six radial grooves 12, and the six sections 5. As is shown in FIG. 1, the cylinder spaces 39 in the 2 o'clock and 8 o'clock positions are connected to the sections 5 by respective recesses 3 which simultaneously communicate with the corresponding nipples 11 and sections 5. As the cam 40 is turned counterclockwise, it pushes the plungers 41 in the 2 o'clock and 8 o'clock positions toward the axis of rotation and drains the corresponding cylinder spaces 39.

As is seen in FIG. 2, the cylinder spaces 39 in the 12 o'clock and 6 o'clock positions of FIG. 1 are blocked by respective recesses 3 except for a constricted leakage path between opposite radial faces of the distributor disc 2 and the body portion 1 (FIG. 2).

As the cam 40 and the recesses 3 turn counterclockwise away from the position shown in FIG. 1, the cylinder spaces 39 in 12 o'clock and 6 o'clock positions are connected by respective recesses 3 to sections 5 and thereby to the return line 35, permitting the corresponding cylinder spaces 39 to be drained as the plungers 41 are pushed radially inward by the cam 40.

Simultaneously, the effective flow sections on the paths admitting pressure fluid to the cylinder spaces in the 4 o'clock and 10 o'clock positions increase and then decrease until the recesses cooperating with the nipples 11 leading to these cylinder spaces reach a condition of full alignment with the nipples and lose communication with the sections 6. When the plunger 41 in the 4 o'clock position reaches the end of its radially outward stroke, its nipple 11 is closed by a recess 3 if the minor leakage path described above is disregarded.

In an analogous manner, the cylinder spaces 39 holding plungers 41 in the 2 o'clock and 8 o'clock positions continue being drained through recesses 3 until communication between the recesses and the nipples of the cylinder spaces is interrupted. The cylinder spaces are practically sealed in the radially innermost position of the associated plungers. When the next recesses 3 again bridge the annular end faces of the nipples 11 to connect them to sections 6, the plungers 41 move radially outward.

While the rotary valve of the invention has been described as constituting an integral part of hydraulic apparatus also including a radial cylinder motor, and such use is preferred at this time, the valve as such may be used otherwise, for example, as a reversing valve for a double acting hydraulic cylinder or other hydraulic motor in the manner disclosed in the afore-mentioned earlier patent, or simply as a shut-off valve.

It should be understood, therefore, that the foregoing disclosure relates only to a preferred embodiment of the invention and that it is intended to cover all changes and variations in the example of the invention herein chosen for the purpose of the disclosure which do not constitute departures from the spirit and scope of the invention set forth in the appended claims.

What is claimed is:

1. Hydraulic apparatus comprising:
   a. a valve casing having a body portion formed with at least one intake opening, at least one discharge opening, and a return opening;
   b. a distributor having a front face and a rear face;
   c. securing means securing said distributor to said body portion for angular movement relative to said body portion about an axis and for limited axial movement, said faces of the secured distributor extending radially relative to said axis;
   d. operating means for moving said distributor about said axis,
      1. said body portion having a planar face, said planar face and said front face being formed with respective recesses alignable for connecting said at least one intake opening with said at least one discharge opening in a predetermined angular position of said distributor for flow of fluid between said intake and discharge openings in a first path through said valve casing; and
   e. cover means spacedly enveloping said distributor in sealing engagement with said body portion, said cover means and said rear face of said distributor bounding therebetween a chamber,
      1. said planar face and said front face defining axially therebetween a first, annular, throttling gap offset radially outward from said recesses and connecting said intake opening with said chamber,
      2. a face of said cover means and a portion of said rear face substantially coplanar with said planar face defining axially therebetween a second throttling gap connecting said chamber to said return opening,
      3. said intake and return openings, said gaps, and said chamber defining a second path of fluid flow through said valve casing,
      4. the effective flow section of said second path being smaller than the effective flow section of said first path.

2. Apparatus as set forth in claim 1, further comprising a spacer member axially interposed between said planar face of said body portion and said cover means, the axial thickness of said spacer member being substantially equal to the combined axial dimensions of said gaps.

3. Apparatus as set forth in claim 1, wherein said distributor includes a disc member carrying said front face, a shaft member carrying said portion of said rear face, and fastening means fixedly fastening said disc member to said shaft member, said securing means securing said shaft member in a bore of said body portion for rotation about said axis and for limited axial movement.

4. Apparatus as set forth in claim 1, wherein said operating means include a hydraulic motor having a fixed portion and a movable portion, said movable portion being connected to said distributor for simultaneous movement, said at least one discharge opening communicating with said hydraulic motor.

5. Apparatus as set forth in claim 4, wherein said body portion is formed with a plurality of said discharge openings, said fixed portion being formed with a plurality of cylinder spaces respectively communicating with said discharge openings, and said movable portion including a piston member in each cylinder space, said recesses being sequentially alignable for alternatively connecting each of said discharge openings with said intake opening and said return opening.

* * * * *